United States Patent [19]
Derighetti et al.

[11] Patent Number: 5,874,703
[45] Date of Patent: Feb. 23, 1999

[54] METHOD AND APPARATUS FOR IMPULSE GENERATOR FOR ELECTROEROSIVE MACHINING OF WORKPIECES

[75] Inventors: René Derighetti, Losone, Switzerland; Silvano Dresti, Cannobio, Italy

[73] Assignee: Agie SA, Losone, Switzerland

[21] Appl. No.: 514,400

[22] Filed: Aug. 11, 1995

[30] Foreign Application Priority Data

Sep. 15, 1994 [DE] Germany ................ 44 32 916.4

[51] Int. Cl.$^6$ .................................................. B23H 1/02
[52] U.S. Cl. ........................................................ 219/69.18
[58] Field of Search ..................... 219/69.13, 69.18; 204/224 M

[56] References Cited

U.S. PATENT DOCUMENTS

| | | | |
|---|---|---|---|
| 3,654,116 | 4/1972 | Iuoue | 204/224 M |
| 5,200,905 | 4/1993 | Uemoto et al. | 219/69.13 |
| 5,416,290 | 5/1995 | Magara et al. | 219/69.18 |
| 5,603,852 | 2/1997 | Goto et al. | 219/69.13 |
| 5,753,882 | 5/1998 | Goto et al. | 219/69.18 |

FOREIGN PATENT DOCUMENTS

| | | | |
|---|---|---|---|
| 0 027 041 | 4/1981 | European Pat. Off. | |
| 0 185 101 | 6/1986 | European Pat. Off. | |
| 268934 | 6/1988 | European Pat. Off. | 219/69.13 |
| 0 545 156A2 | 6/1993 | European Pat. Off. | |
| 2.053.633 | 4/1971 | France | |
| 22 14 218 | 10/1972 | Germany | |
| 40-28034 | 12/1940 | Japan | |
| 44-19689 | 8/1969 | Japan | |
| 49-26897 | 3/1974 | Japan | |
| 50 113896 | 9/1975 | Japan | |
| 59-134621 | 8/1984 | Japan | |
| 59-227323 | 12/1984 | Japan | |
| 61-270025 | 11/1986 | Japan | |
| 63-102825 | 5/1988 | Japan | |
| 1-234114 | 9/1989 | Japan | 219/69.18 |
| 2-279214 | 11/1990 | Japan | 219/69.18 |
| 3-55117 | 3/1991 | Japan | 219/69.18 |
| 3-55119 | 3/1991 | Japan | |
| 4-19016 | 1/1992 | Japan | |
| 4-75822 | 3/1992 | Japan | |
| 536 166 | 6/1973 | Switzerland | |
| 657945 | 4/1979 | U.S.S.R. | 219/69.18 |

OTHER PUBLICATIONS

Patent Abstracts of Japan, vol. 16, No. 132, p. 1.
European Search Report of Corresponding Application, EP 95 11 0306 of Nov. 23, 1995.
English language translation of Japanese Office Action in corresponding application with a copy of Japanese Office Action. No Date.
Derwent Abstract for JP 3–55119, No Publication Date.
Derwent Abstract for JP 4–19016, No Publication Date.
Derwent Abstract for JP 4–75822, No Publication Date.
Derwent Abstract for JP49–26897, No Publication Date.
Derwent Abstracts for JP 50–113896, No Publication Date.
Derwent Abstract for JP59–134621, No Publication Date.
Derwent Abstract for JP 59–227323, No Publication Date.
Derwent Abstract for JP 61–270025, No Publication Date.
Derwent Abstract for JP 63–102825, No Publication Date.

*Primary Examiner*—Geoffrey S. Evans
*Attorney, Agent, or Firm*—Darby & Darby

[57] ABSTRACT

A method and apparatus for electroerosive machining (i.e. electric discharge machining) of workpieces is accomplished by supplying pulses of varying polarity to the gap between an electrode and a workpiece. Instead of a pause between pulses of the same polarity, the pulse generator inserts a pulse of reverse polarity whose duration is selected so that removal is at a maximum rate and wear of the electrode is still permissible. The reverse polarity pulses themselves cause machining of the workpiece. A fuzzy logic controller is used to optimize the pulse duration of successive pulses.

22 Claims, 4 Drawing Sheets

METHOD AND APPARATUS FOR IMPULSE GENERATOR FOR ELECTROEROSIVE MACHINING OF WORKPIECES

BACKGROUND OF THE INVENTION

1. Field of the Invention

The present invention relates to a method for electroerosive machining of workpieces by pulses of changing current polarity and to an impulse or pulse generator for carrying out of the process.

2. Description of the Related Art

Electroerosive machining, as is known, is based on the discharge of a spark which takes place between a machining electrode and a workpiece electrode—hereinafter simply referred to electrode and workpiece. The electrode and the workpiece are immersed in an insulating liquid, the dielectric. Generally, the energy necessary for the spark and maintaining of the discharge is supplied by a power pulse generator. The direction of current flow or polarity of the (machining) pulse acting on the workpiece and the electrode depends predominantly on the desired erosion results, as well as on the material of the electrode and of the workpiece, the dielectric used, etc. Thus, for determining the polarity, the removal behavior on the workpiece and on the electrode as a function of the duration in time of the pulse—hereinafter referred as "pulse duration" is used for each work process.

For traditional sinker erosion by means of current pulses of constant direction of flow, the workpiece is frequently connected as cathode and the electrode as anode so that, taking into account the resolidification effect on the electrode, the undesired removal on the electrode (electrode wear) is kept as small as possible. Also, the electrode wear in the case of wire eroding plays a subordinate role, because the wire electrode is continuously replaced. In traditional wire erosion with current pulses of constant current direction, maximum removal on the workpiece is primarily desired. In this case, the workpiece is connected to the anode and the electrode to the cathode of the pulse generator.

From the disclosure of Swiss 536 166 a process for electroerosive machining of workpieces by current pulses of alternating direction of current is also known. By actuating switch means which are arranged in the feed branch of the machining unit, the direction of the current between the workpiece and the electrode is reversed during the duration of a current pulse.

It is essential for all the above erosion processes that an interpulse period (a pause between the pulses) is necessary between successive (machining) pulses in order to deionize the discharge channel which is developed between the workpiece and the electrode and in this way avoid degeneration of the erosion process. In this connection, the current or the voltage at the machining unit is set to zero—and therefore no difference in potential is present between the workpiece and the electrode during the interpulse period. The interpulse period must continue in the known processes, for at least such a time that the conductance of the discharge channel is reduced to such an extent that, via the deionization, a new discharge can take place at a new place. Interpulse periods which are too short lead to an undesired concentration of discharges at the same place and possibly to a degeneration of the erosion process.

The interpulse period between successive pulses represents, however, an undesired loss of time which has an unfavorable effect on the economy of known processes for the electroerosive machining of workpieces.

The invention is directed at remedying this situation.

SUMMARY OF THE INVENTION

The object of the present invention is to alleviate these disadvantages. In accordance with the invention, a pulse form of successive pulses of different direction of flow or polarity are optimized or selected such that the interpulse period can be reduced down to a value of zero. In the case of a pulse generator for the production of pulses of varying current direction or polarity for an apparatus for the electroerosive machining of workpieces, a control device is provided for controlling the pulse form of successive pulses of different direction of flow or polarity in such a manner that the interpulse period can be reduced down to a value of zero.

This invention is based on the discovery that, upon electroerosion by means of successive pulses, the pulse parameters, such as the direction of current flow or voltage polarity as well as the pulse duration and/or pulse amplitude, can be selected such that the interpulse period between successive pulses can be reduced to a value of zero without degeneration of the erosion process. In known processes, the pulse interval was always urgently necessary in order to assure deionization of the discharge channel between two pulses.

The erosion region in accordance with the invention of the pulse intervals which have been reduced down to zero has nevertheless the desired material-removing action at the base points of the discharge channel. In addition, the process of the invention has the following advantages over known erosion processes with pulse intervals:

1. Increase of the removal rate by more than 50% and, in hand therewith, a considerable saving in time since the "removal-less" pulse interval is reduced down to zero;
2. Avoidance of corrosion and/or electrolysis phenomena on the surface of the workpiece—due to the direct sequence of pulses of different direction of flow;
3. Obtaining of extremely "fine" surfaces: The so-called maximum roughness ($R_{max}$) is considerably less because local concentrations of discharges are avoided due to the process of the invention. In the ideal situation, a new discharge always takes place at a new place. This way, assurance is had that the electroerosive machining automatically uniformly covers a machining zone on the workpiece; and
4. An increase in the removal without simultaneous (undesired) increase of the roughness of the surface.

In the case of small and medium pulse current, the pulse form of successive pulses of different direction of current can be so optimized that the pulse interval can be completely eliminated or done away with. Only with extremely high pulse current flows can it be meaningful, due to the strong ionization of the discharge channel which goes hand in hand therewith, to provide an pulse interval between the pulses of different current flow direction. This pulse interval, however, is considerably shorter than the one which would be necessary in the case of pulses of constant current flow direction.

Thus, the erosion range of the invention proceeds from the known erosion processes having certain pulse intervals and covers the region to constantly shorter interpulse periods, down to erosion without any interpulse period.

In accordance with another embodiment of the invention, the pulse duration of successive pulses of different current direction are selected at least so short that a pulse can directly follow a previous pulse without any danger of degeneration. In other words, there is a maximum permissible duration ($t_{max}$) of successive pulses below which erosion can be effected without pulse intervals. The erosion current is then caused predominantly by the electron current and the ion contribution is negligible. The deionization of the discharge channel can then take place considerably faster than in the case of electroerosion by pulses of the same direction of flow. There is thus no danger of degeneration of the erosion process.

For of the determination of the maximum permissible pulse duration ($t_{max}$), the pulse generator of the invention has a control circuit. In it—with predetermined current intensity, composition of the dielectric and of the material of the electrode or workpiece—the pulse duration of the pulses can be shortened stepwise down to operation without interpulse period. As criterion for this, the tendency of the erosion process to degenerate is used: the electrode voltage at the machining unit is monitored for a possible drop below a critical value and/or the sparking process is monitored for possible absence of the sparking delay. The value of $t_{max}$ is determined by means of a control circuit which preferably has a measuring device for monitoring the sparking and discharge process at the machining unit.

The consequence is that different values for the maximum permissible pulse duration are obtained depending on specific erosion parameters. In general, the maximum permissible pulse durations are less than the pulse durations of the monopolar machining pulses of known erosion processes. The maximum permissible pulse duration limits the frequency of the machining pulses in downward direction. Excellent results are obtained with frequencies between 1 and 4 MHz and pulse currents of between 4 and 8 amperes.

In particular, the combination of high pulse currents with the learned short successive pulses of different direction of flow or polarity are suitable not only for the machining of fine surfaces but also for the machining of large surfaces, for instance upon rough finishing. It can also be noted experimentally that with increasing pulse currents—and in this context, greater roughness of surface—the maximum permissible pulse duration ($t_{max}$) of the pulses increases. It is therefore meaningful to select a longer maximum permissible pulse duration ($t_{max}$) of the pulses in the case of higher pulse currents.

In accordance with another variant of the invention, the pulse duration ($t_{opt}$) of successive pulses—within a range having a maximum limit of $t_{max}$—is so selected that the sum of the removals by successive pulses on the workpiece is maximum and/or the electrode wear is minimum or a predetermined value is not exceeded. The control circuit of the pulse generator of the invention is accordingly preferably designed for the automatic optimizing of the permissible pulse duration with respect to the maximum removal from the workpiece and/or the minimum or predetermined wear of the electrode. This way, the spark-erosive machining can be easily and flexibly adapted to different erosion conditions; for example, in the case of the erosion of openings, minimum wear of the cost-intensive machining electrodes is desirable. On the other hand, in the case of wire erosion, the main factor frequently is a high removal capacity on the workpiece and the high speed of machining which goes hand in hand therewith.

In a preferred embodiment of the automatic optimizing of the permissible pulse duration ($t_{opt}$):

1. the actual value of the erosion voltage, of the erosion current, and/or of the erosion speed (also referred to as speed of feed) on the machining unit is determined by a measuring device; and
2. the measurement signals are fed into a fuzzy controller arranged behind the measuring device for the automatic optimizing of the permissible pulse duration in accordance with the criteria mentioned above.

For the automatic optimizing of the optimal permissible pulse duration ($t_{opt}$) of successive pulses, fuzzy logic is particularly suitable, it leading faster to solutions for the values of $t_{opt}$ than the conventional continuous control technique.

The invention provides further for automating such that the values ascertained for the maximum permissible pulse duration ($t_{max}$) and/or for the optimal permissible pulse duration ($t_{opt}$) of successive pulses as a function of the specific erosion parameters, for example, current intensity, composition of the dielectric and of the electrode and workpiece material, etc. are stored preferably in a control device, in particular a CNC control. These values can automatically be called up, for example, at the start of the electroerosive machining. This means a considerable simplification of the erosion process and an improvement in the ease of operation of the electro-erosion apparatus.

The selection of the specific pulse form of successive pulses of different direction of current flow or polarity is also of great importance.

The machining unit is preferably acted on by successive dc pulses of different current flow direction. The optimal pulse duration ($t_{opt}$) and/or pulse amplitude of a "positive" and a following "negative" pulse is, in general, not the same. In many uses, the pulse duration and/or the pulse amplitude of successive dc pulses can be selected of the same size. In the last-mentioned case, a pulse generator or pulser for the production of such pulses can be constructed correspondingly more simply since then an expensive control of the switch means and/or a multiple storing can be dispensed with. This applies also to the use of HF pulse alternating current sources for the feeding of the machining unit with ac pulses.

Upon the electroerosion with an aqueous dielectric, it is advantageous to select the pulse durations and/or the pulse amplitudes of successive dc pulses of different direction of flow in such a manner that the average pulse current at the machining unit is qual to zero. In this way, electrolytic reactions and the undesired deposits of so-called "white layer" on the workpiece and other metallic parts of the erosion device which goes hand in hand therewith, are substantially avoided.

Under given erosion conditions, it may be advantageous for the machining unit to be acted on by packages of pulses consisting of more than two successive pulses of reversed polarity or direction of flow. This is of advantage in particular in the case of very high pulse currents and the strong ionization of the discharge path which goes hand in hand therewith.

For the production of the pulse forms described it is suitable to utilize a pulse generator having the following circuit arrangement: a bridge circuit wherein the machining unit is connected in the cross connection (shunt arm), and wherein in the series connections in each case at least one power switch controlled by a common control, in particular a power MOSFET, are present, at least one source of direct voltage being arranged parallel to the shunt arm or one source of voltage being arranged in series with the grounded bridge circuit. Depending on the position of the power switches, the bridge circuit is optionally connected and current flows through in one of the other bridge diagonals. By simultaneous switching of opposite switch pairs, the direction of flow of the pulses in the machining unit can be reversed as desired. In this way, the pulser can adapt the desired flow-direction of polarity characteristic of the machining pulses to the existing erosion conditions.

In order further to control the technological parameters of the pulses, the following circuit measures are preferably proposed:

Each of the controllable power switches is provided with its own feed source for the operating of its control electrode. This way, the control commands of the power switches are prevented from unfavorably affecting each other in any undesired manner. Pulse transformers in the feed and control paths of the power switches assure a disturbance-free transmission of the control commands to the corresponding power switches. Several parallel-connected controllable current-limiting stages with resistors or inductances are preferably provided in the shunt arm of the bridge circuit, they being adapted to be connected and disconnected by the common control of the machining unit. In this way, the desired pulse amplitude of successive pulses is adjusted.

Further advantages and developments of the invention will become apparent from the following description of the preferred embodiments.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE PREFERRED EMBODIMENTS

It may be pointed out here that, in the following specification, the expression "current pulses of varying direction of flow" means, of course, the same as "voltage pulses of varying polarity".

In accordance with one advantageous embodiment of the erosion process, the machining unit, consisting of workpiece and electrode of an erosion apparatus, is acted on by directly successive dc pulses of different direction of flow. For a predetermined intensity of current or pulse amplitude, the pulse duration of the dc pulses is selected so short that no interpulse period is required between the pulses. The maximum permissible pulse duration $t_{max}$ below which the interpulse period can be dispensed with without degeneration of the erosion process is determined experimentally: In this connection, the pulse duration of the current pulses is shortened stepwise with constant pulse amplitude and at the same time the tendency towards degeneration of the erosion process is observed. For this purpose, the erosion voltage of a machining unit is, for instance, continuously monitored. If it exceeds a predetermined value, or if a sparking of the discharge takes place without considerable sparking delay, this is an indication of the degeneration of the erosion process. If there is no degeneration with progressive shortening of the pulse duration of successive current pulses, the limit of the maximum permissible pulse duration $t_{max}$ with which one can operation without interpulse period is reached.

The value $t_{max}$ is then stored as a function of the specific erosion parameters in a CNC control of the erosion apparatus and preferably automatically set to a value $t_{opt}$ which is optimized in accordance with given criteria.

With a suitable selection of the pulse durations t of successive pulses, preferably dc pulses, (within the range $t \leq t_{max}$) the erosion process of the invention results in a considerable increase in the removal rate as compared with traditional processes; instead of inserting a "removal-less" interpulse period after each current pulse of given direction of flow, a further dc pulse of reversed direction of flow follows directly, it contributing to the removal in precisely the same manner as its immediately preceding dc pulse. The removals by successive dc pulses of different direction of flow, accordingly, add on to each other.

This will be explained with reference to the graph of FIG. 1. In that figure, a typical removal process Vw on a workpiece, for instance of copper, and on an electrode, for instance of steel, is plotted as a function of the pulse duration t of monopolar dc pulses for two directions of current with constant current intensity: The solid lines represent the removal with positively poled workpiece W(+) and negatively poled electrode E(−); the dashed lines, on the other hand, indicate the erosion with negatively poled workpiece W(−) and positively poled electrode E(+).

Figure 1:
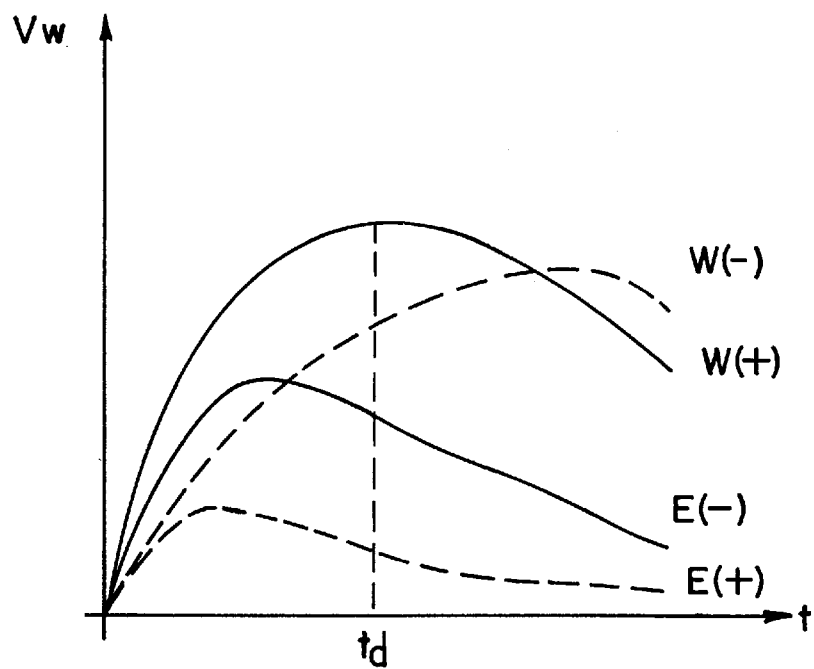
FIG. 1 is a graph showing the removal on the workpiece or the electrode as a function of the pulse duration of current pulses with constant pulse amplitude, for different polarity of workpiece and electrode.

Upon the traditional wire erosion, the machining unit is acted on or subjected to, for example, by monopolar dc pulses of the polarity shown in solid lines in FIG. 1. In this connection, as is known, maximum removal on the workpiece is desired. The removal on the wire electrode (electrode wear) plays a minor role since the wire electrode is regularly renewed. Therefore, a value $t_d$ in the region of the maximum workpiece removal is selected for the pulse duration of the monopolar dc pulses. Between two successive current pulses, however, an interpulse period must be inserted in the known process in order in this way to deionize the discharge channel.

In the embodiment of the invention, successive dc pulses of different direction of flow having such short pulse durations that the interpulse period can be dispensed with are selected. Instead of inserting an interpulse period after each pulse of "negative" polarity, a current pulse of "positive" polarity follows directly. If, in FIG. 1, the interpulse period in the region of short pulse durations is replaced by a following current pulse of reverse direction of flow, the removal on the workpiece and on the electrode can be practically doubled.

The region of permissible pulse durations is limited by the maximum permissible pulse duration $t_{max}$ which, in general, is considerably shorter than the pulse durations of monopolar current pulses used in traditional processes.

On the basis of the course of removal in FIG. 1, the pulse duration t in the region of permissible pulse durations $t \leq t_{max}$ can be optimized for specific erosion parameters, for instance material pairing of workpiece and electrode, dielectric, etc., with regard to the desired erosion results: The pulse duration can, for instance, be so selected in the case of wire erosion or in special applications of sinker erosion, such as in electroerosive drilling, that the total removal on the workpiece and therefore the sum of the removals of successive dc pulses is maximum, and this for a predetermined roughness of the surface, which, as is known, depends on the height of the pulse current. At the same time, the total removal on the electrode (electrode wear) should not exceed a value predetermined for instance by the ultimate strength of a wire electrode. The optimal permissible pulse duration $t_{opt}$ resulting from this then determines the frequency of the current pulses. For other cases, for instance in the case of the sinker erosion in accordance with the invention, the pulse duration in the region $t \leq t_{max}$ can also be selected on the basis of FIG. 1 that the electrode wear is minimal or the so-called relative wear, i.e. the ratio between the electrode wear and the workpiece removal, does not exceed a predetermined value.

Figure 5:
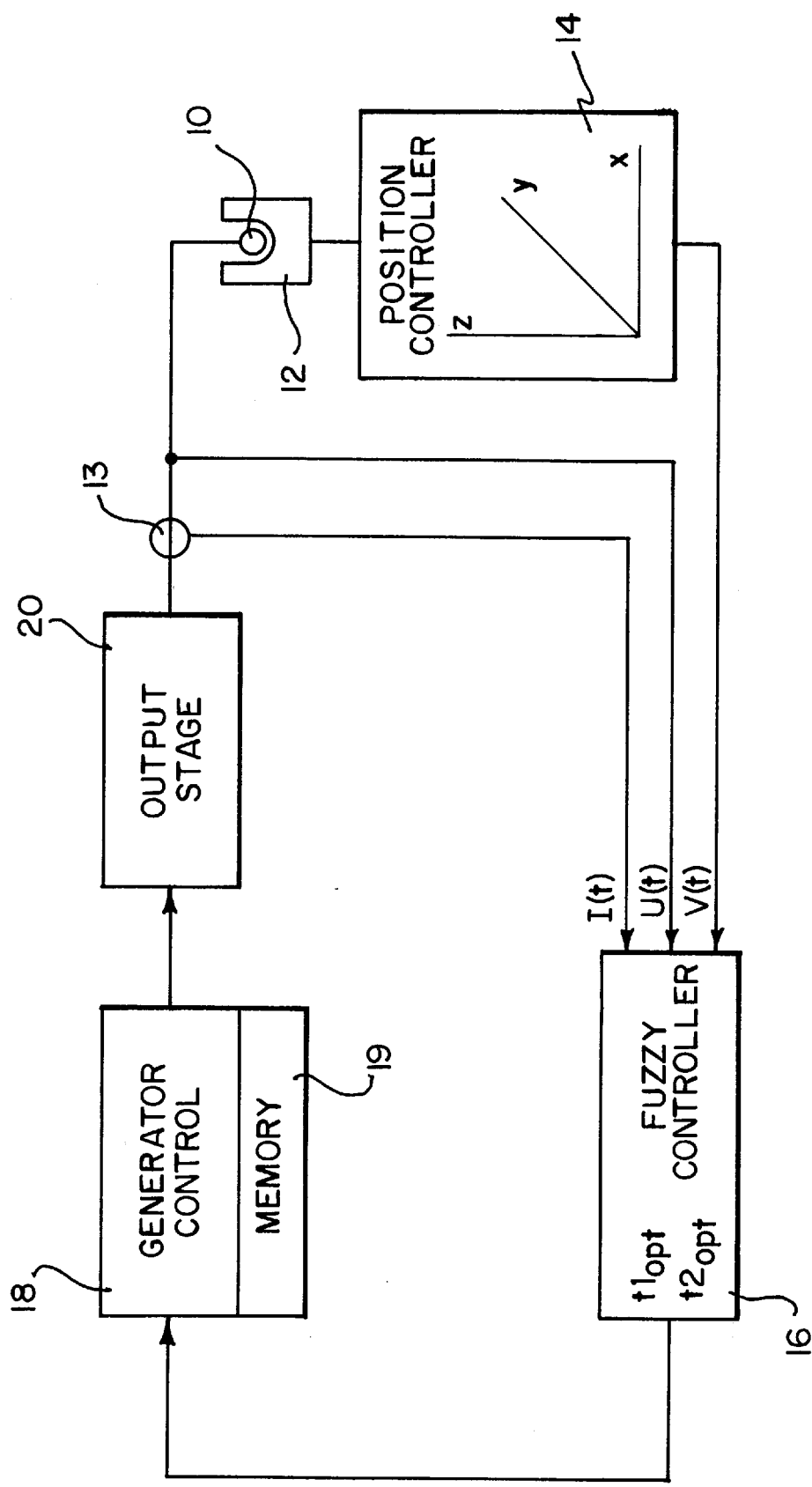
FIG. 5 shows a control circuit for determining the optimum permissible pulse duration of successive pulses of different direction of flow.

FIG. 5 shows a control circuit for the automatic optimizing of the permissible pulse duration of successive dc pulses based on the course of removal shown in FIG. 1. In this connection, a measurement device 13, 14 is provided for monitoring the erosion process, it continuously determining the existing measured values of the erosion current I(t), the erosion voltage U(t), and the erosion rate or speed of feed V(t) on the machining unit—comprising an electrode 10 and a workpiece 12—of a sinker erosion apparatus. The last-mentioned erosion rate V(t) is supplied by a position controller 14 which controls the feed of the workpiece 12 in x,y,z direction with respect to the sinker electrode 10. These measured values are fed to a fuzzy controller 16 which obtains therefrom, first of all, information with regard to the removal on the workpiece 12 and the sinker electrode 10 and optimizes the pulse duration of successive dc pulses—with predetermined pulse amplitudes—on basis of the above-mentioned criteria in the fuzzy logic process. The optimally permissible pulse durations $t1_{opt}$, $t2_{opt}$ are then received by a generator control 18 and deposited there in a memory 19 as function of the specific erosion parameters, such as current intensity, composition of the dielectric, electrode material, material of the workpiece, etc. At the start of the electroerosive machining of a workpiece, the optimally permissible pulse durations and corresponding pulse amplitudes are automatically selected, depending on the erosion condition from the generator control 18 and transferred to an output stage 20 which acts on the machining unit 10, 12 with dc pulses of the selected parameters.

Figure 2:
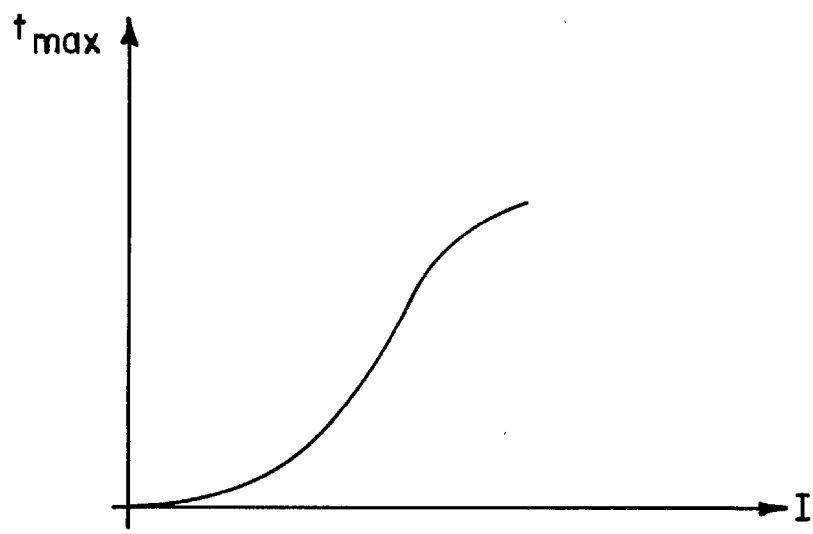
FIG. 2 is a graph showing the maximum permissible pulse duration as a function of the pulse amplitude.

Up to now, the current intensity or pulse amplitude of the machining pulses was assumed to be pre-established as a function of the surface roughness desired. With an increase in current intensity I and increasing surface roughness which goes hand in hand therewith, the maximum permissible pulse duration $t_{max}$ as a rule also increases, for instance in accordance with the curve shown in FIG. 2.

Figure 3:
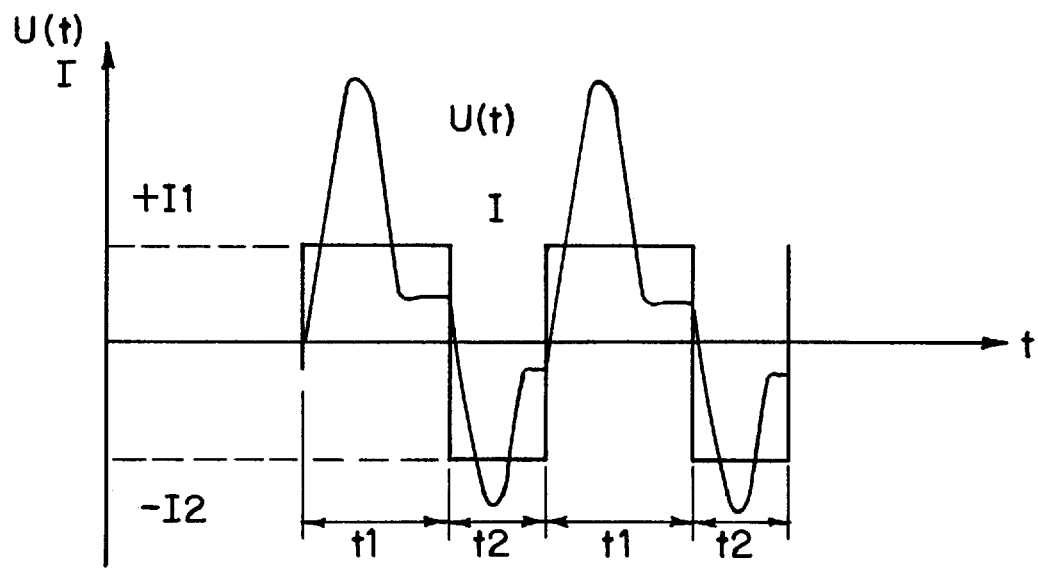
FIG. 3 is graph with current pulses of varying direction of flow with different pulse durations and the resultant variation of the voltage at the erosion gap.

The optimal pulse durations of successive dc pulses of reversed direction of flow are generally not the same. FIG. 3 shows, for instance, a variation with time of the current I of the process of the invention, in which the machining unit is acted on by successive dc pulses of different pulse duration t1, t2 and different pulse amplitude +I1, −I2. During the time t1, a "positive" current pulse of amplitude I1 is present, which is followed directly by a "negative" current pulse of amplitude I2 and duration t2 with reversed direction of flow. This cycle is then repeated, commencing with the "positive" current pulse of the pulse duration t1.

Figure 4:
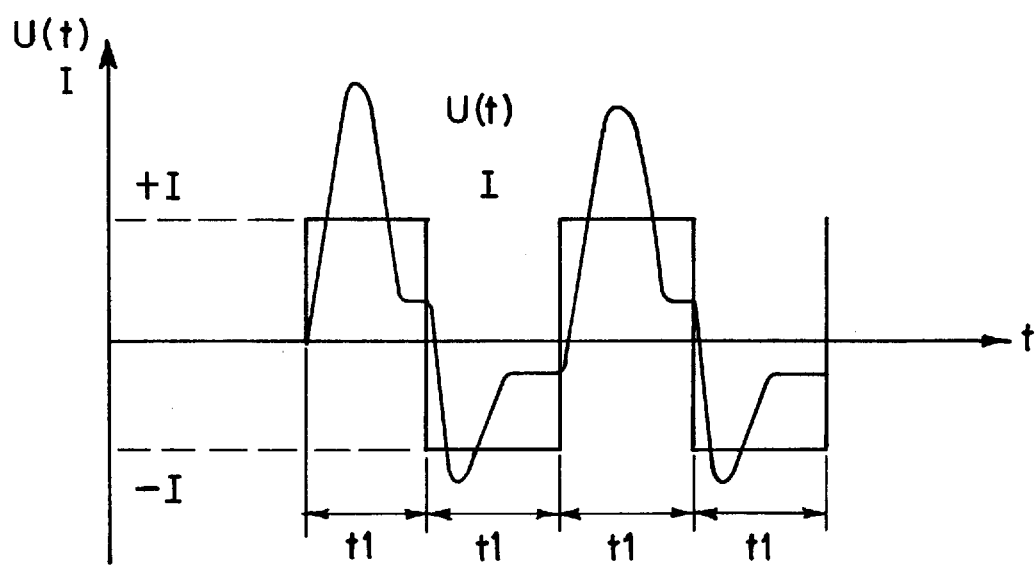
FIG. 4 is a graph with current pulses of varying direction of flow with the same pulse duration and the resultant variation of the voltage at the erosion gap.

FIG. 4 shows a further course of the current I which acts on the machining unit, "positive" and "negative" dc pulses having the same pulse duration t1 and the same pulse amplitude +I, −I directly following each other.

In FIGS. 3 and 4, the course of the voltage U(t) resulting on the machining unit is shown in thin line. The voltage U(t) over the spark or discharge path between the workpiece and the electrode assumes different shapes and instantaneous values depending on the stage of the discharge and the condition corresponding thereto of the discharge channel. As already stated, these values are measured, for instance, continuously and are fed to the above controller 16 for further evaluation.

Figure 6:
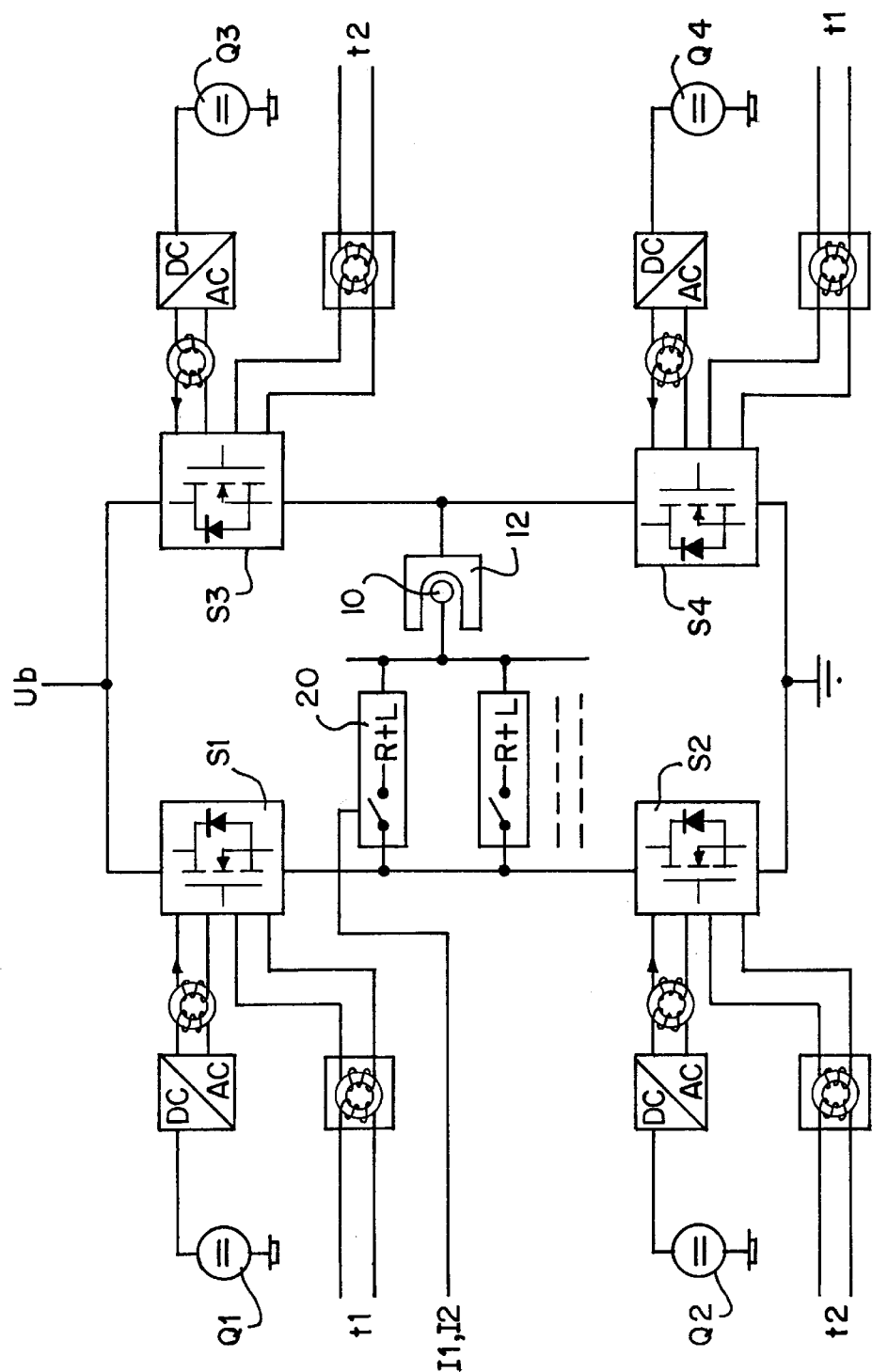
FIG. 6 is a circuit arrangement for producing the variation of current shown in FIGS. 3 and 4.

FIG. 6 shows a preferred variant of the circuit for producing the current courses I shown in FIGS. 3 and 4: In this embodiment, the machining unit, consisting of an electrode 10 and a workpiece 12, is arranged in the shunt arm of a bridge circuit. A power switch S1, S2, S3, S4 is present in each of the series arms of the bridge circuit. The power switches S1 to S4 can be connected via a common control (of the type designated by the reference numeral 18 of FIG. 5), not shown here, which establishes the values of the pulse durations t1, t2 of successive current pulses. With each of the power switches S1 to S4 there is associated a separate source of supply Q1 to Q4 in order to switch the control electrode of the power switches S1 to S4 without influencing each other. In the circuit of FIG. 6, pulse transformers are furthermore provided in the feed and control paths of the power switches S1 to S4, they assuring a disturbance-free transfer of the feed and control signals of the power switches S1 to S4.

A positive dc source Ub supplies the feed voltage for the above bridge circuit, which lies in series between the direct voltage source Ub and a ground-potential connection.

Furthermore, in the shunt arm of the bridge circuit, more precisely in the feed line to the electrode 10, there are present several controllable current-limiting stages 20—arranged parallel to each other—consisting of resistors R and inductances L, each of which can be connected via a switch by the common control to the machining unit. By optional connecting and disconnecting of one or more current-limiting stages 30 in the shunt arm of the bridge circuit, the amplitude of successive current pulses is adjusted to the desired value, for instance to the values I1 and I2 of the current in FIG. 3.

In the operating condition, the present circuit provides, for instance, the course of the current shown in FIG. 3 by the periodic opening and closing of the power switches S1 to S4 as well as of the current-limiting stages 20; during the pulse duration T1 of the "positive" pulse, the power switches S2 and S3 are conductive and the power switches S1 and S4 are blocked. The pulse current then flows from the voltage source Ub over the power switch S3 through the machining unit 10, 12 and over the power switch S2 to ground, namely with a pulse amplitude I1 which is dependent on the switch position of the current-limiting stages 20. After the expiration of the pulse duration t1, the power switches S1 to S4 are so switched simultaneously in pairs that the power switches S2 and S3 are blocked and the power switches S1 and S4 are conductive for a pulse duration t2. At the same time, the switch position of the current-limiting stages 20 is changed in order to adjust a pulse amplitude I2 for the "negative" pulse. The pulse current now flows through the second bridge diagonal, namely from the voltage source Ub over the power switch S1 through the machining unit 10, 12 and over the power switch S4 to ground potential. A new cycle with the "positive" pulse t1, I1 then commences without inter-pulse period.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of controlling an electro-erosion operation of a machining unit having a machining gap formed between an electrode and a workpiece, comprising the steps of:
   supplying successive bipolar pulses having a pulse duration and varying current direction to the machining gap;
   selecting the pulse duration of the successive bipolar pulses to be below a maximum pulse duration so that the interpulse period between successive bipolar pulses is reduced to a value of zero, such as to produce erosion current by substantially electron current; and
   applying the successive bipolar pulses across the machining gap for performing material removal in the electro-erosion operation during each successive bipolar pulse.

2. The method according to claim 1, further comprising the step of:
   selecting the pulse duration of successive bipolar pulses so that the pulse duration is at least so short that a bipolar pulse can be followed directly by another bipolar pulse without danger of degeneration.

3. The method according to claim 2, further comprising the step of:
   monitoring an erosion voltage (U(t)) of the machining unit, with the machining unit having a workpiece and an electrode, to monitor for at least one of a possible drop below a critical value and a sparking process resulting from the supplied bipolar pulses for a possible absence of a sparking delay for determining the danger of degeneration.

4. The method according to claim 2, wherein the permissible pulse duration ($t_{opt}$) of successive bipolar pulses is selected such that at least one of the material removal is maximum and electrode wear does not exceed a predetermined value.

5. The method according to claim 4, further comprising the step of:
   continuously monitoring at least one of the erosion voltage (U(t)), an erosion current (I(t)), and an erosion rate (V(t)) at the machining unit; and
   optimizing the pulse duration ($t_{opt}$) using a fuzzy controller for performing at least one of the steps of maximizing the removal of the material and minimizing the electrode wear.

6. The method according to claim 5, further comprising the step of storing at least one of the maximum permissible pulse duration ($t_{max}$) and the optimal permissable pulse duration ($t_{opt}$) as a function of the specific erosion parameters in a CNC control and, upon demand, calling up at least one of the stored maximum permissable pulse duration ($t_{max}$) and the optimal permissable pulse duration ($t_{opt}$) from the CNC control.

7. The method according to claim 6, further comprising the step of subjecting the machining unit directly to successive dc pulses as the bipolar pulses of the different current flow directions.

8. The method according to claim 7, wherein at least one of the pulse duration and the pulse amplitude, respectively, of successive dc pulses as the bipolar pulses is selected to be of the same size, respectively.

9. The method according to claim 7, wherein at least one of the pulse duration and the pulse amplitude of successive dc pulses as the bipolar pulses is selected such that the average pulse current is substantially zero.

10. The method according to claim 6, wherein the machining unit is subjected to alternating current pulses as the bipolar pulses.

11. The method according to claim 10, wherein the machining unit is subjected to a pulse packet having more than two successive bipolar pulses of reversed current flow direction.

12. A pulse generator for producing pulses of varying current flow direction or voltage polarity for a machining unit to perform an electro-erosion operation, with the machining unit having a machining gap formed between an electrode and a workpiece, comprising:
    a generator control including a memory and an output stage for supplying successive bipolar pulses having a pulse duration and varying current direction to the machining gap; and
    a control circuit for selecting the pulse duration of successive bipolar pulses to be below a maximum pulse duration so that the interpulse period between successive bipolar pulses is reduced to a value of zero, and for applying the selected successive bipolar pulses across the machining gap for performing the material removal in the electro-erosion operation during each successive bipolar pulse.

13. The pulse generator according to claim 12, further comprising a control circuit for determining the maximum permissible pulse duration ($t_{max}$) such that a bipolar pulse is followed directly by another bipolar pulse without degeneration.

14. The pulse generator according to claim 13, further comprising a measuring device connected to the control circuit for monitoring the erosion voltage (U(t)) on the machining unit, with the machining unit having a workpiece and an electrode, for monitoring for at least one of a possible drop below a critical value and a sparking process for a possible absence of a sparking delay.

15. The pulse generator according to claim 13, wherein the control circuit is designed for automatically optimizing at least one of the permissible pulse duration ($t_{opt}$) with reference to a maximum material removal from workpiece and electrode wear to be below a predetermined value.

16. The pulse generator according to claim 15, wherein the control circuit comprises:
    a measurement device for detecting at least one of an erosion voltage (U(t)), an erosion current (I(t)), and an erosion rate (V(t)) of the machining unit; and
    a fuzzy controller, connected to the measuring device, for automatically optimizing the permissible pulse duration ($t_{opt}$).

17. The pulse generator according to claim 16, wherein the control unit further comprises a CNC controller which controls automatic selection of at least one of the maximum permissible pulse duration ($t_{max}$) and the optimal permissible pulse duration ($t_{opt}$) of successive pulses as a function of the specific erosion parameters.

18. The pulse generator according to claim 17, wherein the CNC controller has a memory for storing at least one of the maximum permissible pulse duration ($t_{max}$) and the optimal permissible pulse duration ($t_{opt}$) as a function of the specific erosion parameters.

19. The pulse generator according to claim 18, further comprising a bridge circuit including a shunt arm and series arms, wherein the machining unit is connected to the shunt arm, and each of the series arms is connected to at least one controllable power MOSFET switch (S1 to S4), with at least a source of dc voltage being arranged parallel to the bridge circuit.

20. The pulse generator according to claim 19, wherein at least one feed source (Q1 to Q4) is associated to a respective power switch (S1 to S4).

21. The pulse generator according to claim 19, further comprising a plurality of pulse transformers (T1 to T4) for signal transfer to the power switches (S1 to S4).

22. The pulse generator according to claim 19, wherein the shunt arm of the bridge circuit is connected to at least one of a controllable resistor and an inductor (L) forming current-limiting stages.

\* \* \* \* \*